3,052,683
4-PHENYL - 1 - (2 - PHENYLSULFINYLETHYL)-4-PROPIONOXYPIPERIDINE AND METHOD FOR ITS PREPARATION
Philip M. Carabateas, East Greenbush, N.Y., assignor to Sterling Drug Inc., New York, N.Y., a corporation of Delaware
No Drawing. Filed Aug. 17, 1960, Ser. No. 50,070
2 Claims. (Cl. 260—293.4)

This invention relates to compositions of matter known in the art of chemistry as substituted-piperidines and to a process for making such compositions.

Piperidines having a wide variety of both aryl and lower-acyloxy substituents attached to the 4-position carbon atom of the piperidine ring are known in the art. Such substituted-piperidines are also known in which one or more aliphatic hydrocarbon radicals are attached to other carbon atoms of the piperidine ring. Piperidines so substituted are known having various radicals attached to the nitrogen atom of the piperidine ring, including for example, (lower-aryl)-mercapto-(polycarbon-lower-alkyl) radicals.

The invention sought to be patented, in its composition aspect, is described as residing in the concept of a molecular structure in which a (lower-aryl)-sulfinyl-(polycarbon-lower-alkyl) substituent is attached to the nitrogen atom (or 1-position) of 4-(lower-acyloxy)-4-(lower-aryl)-piperidines. These compounds have unexpected advantages when compared with the corresponding known 1 - [(lower-aryl) - mercapto - (polycarbon-lower-alkyl)]-piperidines.

In its process aspect, the invention sought to be patented is described as residing in the concept of reacting a 4-(lower-acyloxy)-4-(lower-aryl)-1-[(lower-aryl)-mercapto-(polycarbon-lower-alkyl)]-piperidine with an oxidizing agent effective to oxidize sulfides to sulfoxides. Various oxidative procedures can be employed, but the one preferred in practicing the invention comprises using a per-organic acid, e.g., peracetic acid, in a suitable solvent or reaction medium, e.g., ethyl acetate. The reaction is exothermic and is carried out preferably by mixing with stirring the reactants at a low temperature, i.e., from about 0° C. to 10° C. The reaction temperature usually rises rapidly up to about 35° C. While the reaction is probably complete after the initial exothermic transformation subsides, the reaction mixture is stirred for an additional hour. Other oxidizing agents that can be used are other per-organic acids, e.g., perbenzoic acid.

The physical embodiments of the invention are white, crystalline solids, slightly soluble in ethyl alcohol. They possess the inherent applied use characteristics of exerting an unexpectedly high analgesic effect in animal organisms, as evidenced by pharmacological evaluation in rats according to standard test procedures.

The foregoing is a general description of the manner and process of making and using the invention so as to enable any person skilled in the art of chemistry to make and use the same.

The molecular structures of the compounds of the invention are established by their mode of synthesis and corroborated by the correspondence of calculated and found values for the elementary analyses for representative examples.

The best mode contemplated by the inventor of carrying out his invention will now be set forth, as follows:

Suspend 6.0 g. of 4-phenyl-1-(2-phenylmercaptoethyl)-4-propionoxypiperidine para-toluenesulfonate in 100 cc. of ethyl acetate, chill the mixture to a temperature of about 0° C. to 10° C., and add with stirring 2.1 g. of 40% peracetic acid, whereupon all solid dissolves and the temperature rises to about 36° C. Stir the resulting solution at room temperature (about 35° C.) for one hour; and remove the ethyl acetate by distilling in vacuo. Triturate the resulting gummy material with ether to obtain a solid. Collect the solid and recrystallize it from isopropyl alcohol to obtain about 4.0 g. of 4-phenyl-1-(2-phenylsulfinylethyl)-4-propionoxypiperidine in the form of its para-toluenesulfonate, M.P. 156.4–157.8° C. (corr.).

*Analysis.*—Calcd. for $C_{22}H_{27}NO_3 \cdot C_7H_8O_3S$: C, 62.44; H, 6.33; S, 11.50. Found: C, 62.10; H, 6.03; S, 11.22.

Following the above procedure using the hydrochloride or ethanesulfonate salt of 4-phenyl-1-(2-phenylmercaptoethyl)-4-propionoxypiperidine instead of the para-toluenesulfonate salt, there is obtained 4-phenyl-1-(2-phenylsulfinylethyl)-4-propionoxypiperidine in the form of its hydrochloride or ethanesulfonate, respectively.

To prepare 4-phenyl-1-(2-phenylsulfinylethyl)-4-propionoxypiperidine in free base form, dissolve the above para-toluenesulfonate in water, treat the solution with aqueous sodium hydroxide solution, extract the alkaline solution with benzene, dry the benzene extract over anhydrous sodium sulfate and remove the benzene by distilling in vacuo.

Pharmacological evaluation of 4-phenyl-1-(2-phenylsulfinylethyl)-4-propionoxypiperidine para-toluenesulfonate in aqueous solution administered to rats subcutaneously using the D'Amour-Smith method has shown that this compound is about forty-three times as potent an analgesic as meperidine hydrochloride on a molar basis in terms of the bases. When tested intraperitoneally by the same method, it was found to be about nine times as potent an analgesic as meperidine hydrochloride on a molar basis in terms of the bases.

The intermediate 4-phenyl-1-(2-phenylmercaptoethyl)-4-propionoxypiperidine and its para-toluenesulfonate salt were prepared as follows: A mixture containing 5.3 g. of 4-phenyl-4-piperidinol, 5.2 g. of 2-chloroethyl phenyl sulfide, 6 g. of sodium carbonate and 50 cc. of n-butanol was refluxed for about 24 hours. The reaction mixture was then cooled, diluted with about 100 cc. of acetone and filtered. The filtrate was concentrated in vacuo to remove the solvent whereupon there was obtained an oil which crystallized on cooling. To this crystalline product, 4-phenyl - 1 - (2 - phenylmercaptoethyl)-4-piperidinol, was added 40 cc. of propionic anhydride and 10 cc. of pyridine; and the resulting mixture was heated overnight on a steam bath. The reaction mixture was heated in vacuo to remove the excess propionic anhydride and pyridine. The remaining material was made basic with 35% aqueous sodium hydroxide solution and was extracted with ether. The ether extract was washed successively with water, aqueous sodium bicarbonate solution and water; dried over anhydrous sodium sulfate; and then concentrated in vacuo to remove the ether. The remaining oily material was dissolved in 15 cc. of ethanol and to this solution was added 5.6 g. of para-toluenesulfonic acid monohydrate in 20 cc. of ethanol. The crystalline product that separated on cooling was collected, washed with cold isopropyl alcohol and recrystallized once from isopropyl alcohol to yield 10.1 g. of 4-phenyl-1-(2-phenylmercaptoethyl)-4-propionoxypiperidine para-toluenesulfonate, M.P. 146.2–147.8° C. (corr.).

*Analysis.*—Calcd. for $C_{22}H_{27}NO_2S \cdot C_7H_8O_3S$: C, 64.29; H, 6.51; S, 11.84. Found: C, 64.37; H, 6.33; S, 11.62.

Pharmacological evaluation of 4-phenyl-1-(2-phenylmercaptoethyl)-4-propionoxypiperidine para-toluenesulfonate in aqueous solution administered to rats intraperitoneally using the D'Amour-Smith method has shown that this compound is about two and seven tenths times as potent an analgesic as meperidine hydrochloride on a molar basis in terms of the bases. In contrast with the results obtained with the corresponding final product, 4-phenyl - 1 - (2 - phenylsulfinylethyl) - 4 - propionoxypiperidine para-toluenesulfonate, this intermediate 1-(2-phenylmercaptoethyl) compound was too insoluble to test subcutaneously by the same method.

The foregoing description of the best modes of carrying out the invention is for purposes of illustration and does not limit the generality of the applicability of the inventive concept as herein set forth. Other 4-(lower-acyloxy) - 4 - (lower - aryl) - 1 - [(lower - aryl) - sulfinyl-(polycarbon-lower-alkyl)]-piperidines and their acid-addition salts can be prepared in the manners above-described by substituting the molar equivalent quantities of the desired 4-(lower-acyloxy)-4-(lower-aryl)-1-[(lower-aryl)-mercapto-(polycarbon-lower-alkyl)]-piperidine and oxidizing agents for the corresponding reactants in the examples and are regarded by the applicant as the full equivalents of the particular embodiments of the invention herein specifically described and claimed.

4 - (lower - acyloxy) - 4 - (lower - aryl) - 1 - [(lower-aryl)-sulfinyl-(polycarbon-lower-alkyl)]-piperidines of the invention can be formulated in the manner conventional for potent analgesics, e.g., in liquid preparations in an aqueous or aqueous-ethanol menstruum or in solid form, e.g., as tablets or powders. The tablet formulations can be prepared using conventional excipients; and the powders can be dispensed in capsule form. These preparations can be administered orally or, in the case of the aqueous preparations, intramuscularly or subcutaneously.

I claim:

1. 4 - phenyl - 1 - (2 - phenylsulfinylethyl) - 4 - propionoxypiperidine.

2. A process for the preparation of 4-phenyl-1-(2-phenylsulfinylethyl)-4-propionoxypiperidine which comprises reacting 4-phenyl-1-(2-phenylmercaptoethyl)-4-propionoxypiperidine with a per-organic acid effective to oxidize sulfides to sulfoxides.

References Cited in the file of this patent

UNITED STATES PATENTS 2,618,637    Archer et al. _____ Nov. 18, 1952